US008418779B2

(12) United States Patent
Leong et al.

(10) Patent No.: US 8,418,779 B2

(45) Date of Patent: Apr. 16, 2013

(54) ROTARY POWER TOOL

(75) Inventors: Chi Hoe Leong, Bayan Lepas (MY); Siew Yuen Lee, Penang (MY); Chun Chee Loh, Penang (MY)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/856,146

(22) Filed: Aug. 13, 2010

(65) Prior Publication Data

US 2011/0048750 A1 Mar. 3, 2011

(30) Foreign Application Priority Data

Aug. 31, 2009 (EP) .................................... 09169001

(51) Int. Cl.
*B23B 45/02* (2006.01)

(52) U.S. Cl.
USPC ............................ 173/170; 173/217; 173/213

(58) Field of Classification Search .................... 173/47, 173/213, 170, 217, 48, 216
See application file for complete search history.

(56) References Cited

U.S. PATENT DOCUMENTS

| | | | | |
|---|---|---|---|---|
| 3,511,947 | A * | 5/1970 | Eikermann et al. | 310/68 A |
| 4,748,353 | A * | 5/1988 | Klingenstein et al. | 310/50 |
| 4,772,765 | A * | 9/1988 | Markle et al. | 200/1 V |
| 4,978,877 | A * | 12/1990 | Quirijnen | 310/239 |
| 5,225,727 | A * | 7/1993 | Melrose et al. | 310/50 |
| 5,311,949 | A * | 5/1994 | Chapin | 173/217 |
| 7,814,816 | B2 * | 10/2010 | Alberti et al. | 81/57.13 |
| 2004/0211576 | A1 | 10/2004 | Milbourne et al. | |
| 2006/0201688 | A1 * | 9/2006 | Jenner et al. | 173/48 |
| 2010/0071923 | A1 * | 3/2010 | Rudolph et al. | 173/48 |
| 2010/0163265 | A1 * | 7/2010 | Hozumi et al. | 173/217 |
| 2011/0030986 | A1 * | 2/2011 | Nagasaka et al. | 173/216 |
| 2011/0073337 | A1 * | 3/2011 | Milbourne et al. | 173/47 |

FOREIGN PATENT DOCUMENTS

| | | | |
|---|---|---|---|
| EP | 0437060 | A2 | 7/1991 |
| EP | 0790697 | A1 | 8/1997 |
| EP | 1050381 | A2 | 11/2000 |
| EP | 1464427 | A2 | 10/2004 |
| EP | 1652630 | A2 | 5/2006 |
| EP | 1970165 | A1 | 9/2008 |
| EP | 2031615 | A1 | 3/2009 |
| GB | 2335011 | A | 9/1999 |
| GB | 2372720 | A | 9/2002 |
| WO | WO2007058320 | A1 | 5/2007 |

* cited by examiner

*Primary Examiner* — M. Alexandra Elve
*Assistant Examiner* — Eyamindae Jallow
(74) *Attorney, Agent, or Firm* — Kenyon & Kenyon LLP

(57) ABSTRACT

A rotary power tool having a tool housing, an internal housing within the tool housing, and a switch assembly that is substantially within the tool housing. According to the invention, the switch assembly is supported by the internal housing and is movable between at least two positions for selecting between at least two tool operational modes. The internal housing is embodied by at least one blocking element that extends towards the tool housing and limits the overall range of motion of the switch assembly.

27 Claims, 4 Drawing Sheets

ROTARY POWER TOOL

CROSS-REFERENCE TO RELATED APPLICATION

This application is based on European Patent Application 09169001.6 filed Aug. 31, 2009.

BACKGROUND OF THE INVENTION

1. Field of the Invention

The present invention relates to a rotary power tool with a rotating switch for determining its operational mode. In particular it relates to improved ways for retaining the switch in defined positions corresponding to respective operational modes.

2. Description of the Prior Art

EP 1 050 381 A2 discloses a rotary tool with a switch for changing between impact operation and drill operation modes. An operation member accessible at the top of the external tool housing is slidable by the user in a back-and-forth manner. The external tool housing limits the range of motion of the operation member by providing discrete stops corresponding to operational modes. This design has the disadvantage that it limits freedom in designing the appearance of the switch and the external tool housing. If there are stresses on the switch due to coupling with internal tool components, excessive wear of the external housing may result. Furthermore, the potential for stack-up errors resulting from necessary cooperation between the switch and the external tool housing may add to the expense of the design.

ADVANTAGES AND SUMMARY OF THE INVENTION

A rotary power tool is described having a tool housing, an internal housing within the tool housing, and a switch assembly that is substantially within the tool housing, wherein the switch assembly is supported by the internal housing and movable between at least two positions for selecting between at least two tool operational modes. The internal housing has at least one blocking element that extends towards the tool housing and limits the overall range of motion of the switch assembly. A switch assembly involved in selecting tool operational modes is preferably coupled with a gear assembly in order to change speeds, for example. As such it is often necessary to provide a blocking element in order to prevent overshifting of the switch assembly which might damage the gear assembly. Positioning of the blocking element on the same component on which the switch assembly is supported has the advantage that less accumulated stack-up error would need to be considered when designing components.

The internal housing may comprise a plurality of gears, as would, for example, the housing of a gear assembly or "gear box". If so, the blocking element can be incorporated on a stand-alone gear assembly that can be incorporated within the tool housing. Since the blocking element is not positioned on the external tool housing, no switch assembly stop surface needs to be present on the external housing. This allows greater freedom of design for the switch assembly, allowing cosmetic aspects rather than mechanical aspects to dictate the design. Since the switch assembly does not rely on the external housing as a stop surface, there is likely to be reduced wear on the external housing. If the switch assembly operates completely independently from the tool housing and is a component of a stand-alone assembly, any modifications to the gear assembly will have less of a design impact on the housing, and therefore may be less costly.

The tool gear assembly may include a gear housing that is generally cylindrically shaped. It would be advantageous under these conditions for the switch assembly to be substantially ring-shaped and rotatable with respect to the gear housing and therefore the tool axis of rotation. In this way the gear housing would support the switch assembly.

Since the switch assembly takes on at least two positions and quite possibly additional positions between extreme positions, at least two limit stops are required for limiting the range of motion of the switch assembly. This can be accomplished if the internal housing (which may be the gear housing) has a second blocking element that extends towards the tool housing and limits the overall range of motion of the switch assembly. Preferably the second blocking element is at a distance from the first blocking element to permit a range of movement for the switch assembly. Together the first and second blocking elements delimit the overall range of movement for the switch. As discussed above, separating the limit stops for the switch assembly from the external tool housing is advantageous. A second blocking element can be readily incorporated onto the internal housing. Since they extend in the direction of the tool housing, the same elements that are provided as limit stops for limiting the range of movement of the switch assembly can advantageously be used for positioning the internal housing within the tool housing. The tool design advantageously incorporates corresponding structures such as ribs on the internal surface of the tool external housing which can cooperate with the structures that include blocking elements for positioning and securing the gear housing within the external tool housing.

Especially if the switch assembly is substantially ring-shaped, interaction with limit stops on the housing can conveniently be mediated by an extension of the switch assembly that extends in a direction of the axis of rotation of the tool so that it is positionable between the blocking elements.

It is desirable for the power tool to incorporate blocking elements that limit the overall range of motion of the switch assembly. In order to select tool operational modes with accuracy, the power tool is preferably provided with an element for retaining the switch assembly in particular positions corresponding to the tool operational modes. One way of accomplishing this is with a switch assembly that has flexibility so that it can be readily overcome retaining features such as a nearby detent when the switch assembly is being moved, but can engage nevertheless with the retaining features once the switch assembly takes on a desired position. This configuration can be advantageously achieved with a switch assembly that has two portions, a switch outer portion having a substantially fixed shape and a switch inner portion that is flexible and which changes shape when the switch assembly is moving between the at least two positions. For example, the inner portion may change shape in a way that provides additional clearance for adjusting the switch assembly. This clearance can be mediated by a flexible switch inner portion is substantially ring-shaped and has at least one ring diameter which increases when the switch assembly is moving between respective positions.

For retaining the switch assembly, the internal housing which supports the switch assembly is advantageously provided with retaining features in addition to the movement limiting features. For example, the switch assembly can be simply retained in one position if the internal housing includes a detent that cooperates with at least one recess on the switch assembly.

If there are features for limiting the range of movement of the switch assembly, it would be advantageous to include features that retain the switch assembly in a defined position at the very same switch assembly positions where the switch assembly reaches a limit stop. Therefore it is preferable if a detent on the internal housing cooperates with at least one recess on the switch assembly when the extension of the switch assembly is in contact with the blocking element.

As a mechanism for disengaging the recess from the detent on the tool housing without causing wear or potentially damaging the detent, the recess is advantageously able to be moved in a direction away from the detent. This is readily accomplished by incorporating the recess within the flexible switch inner portion. When the switch inner portion changes shape by increasing its effective diameter, clearance is created for moving the recess away from the detent without contacting the detent.

BRIEF DESCRIPTION OF THE DRAWINGS

The invention is described in detail below in conjunction with the accompanying drawings, in which.

DESCRIPTION OF THE PREFERRED EMBODIMENTS

Figure 1:
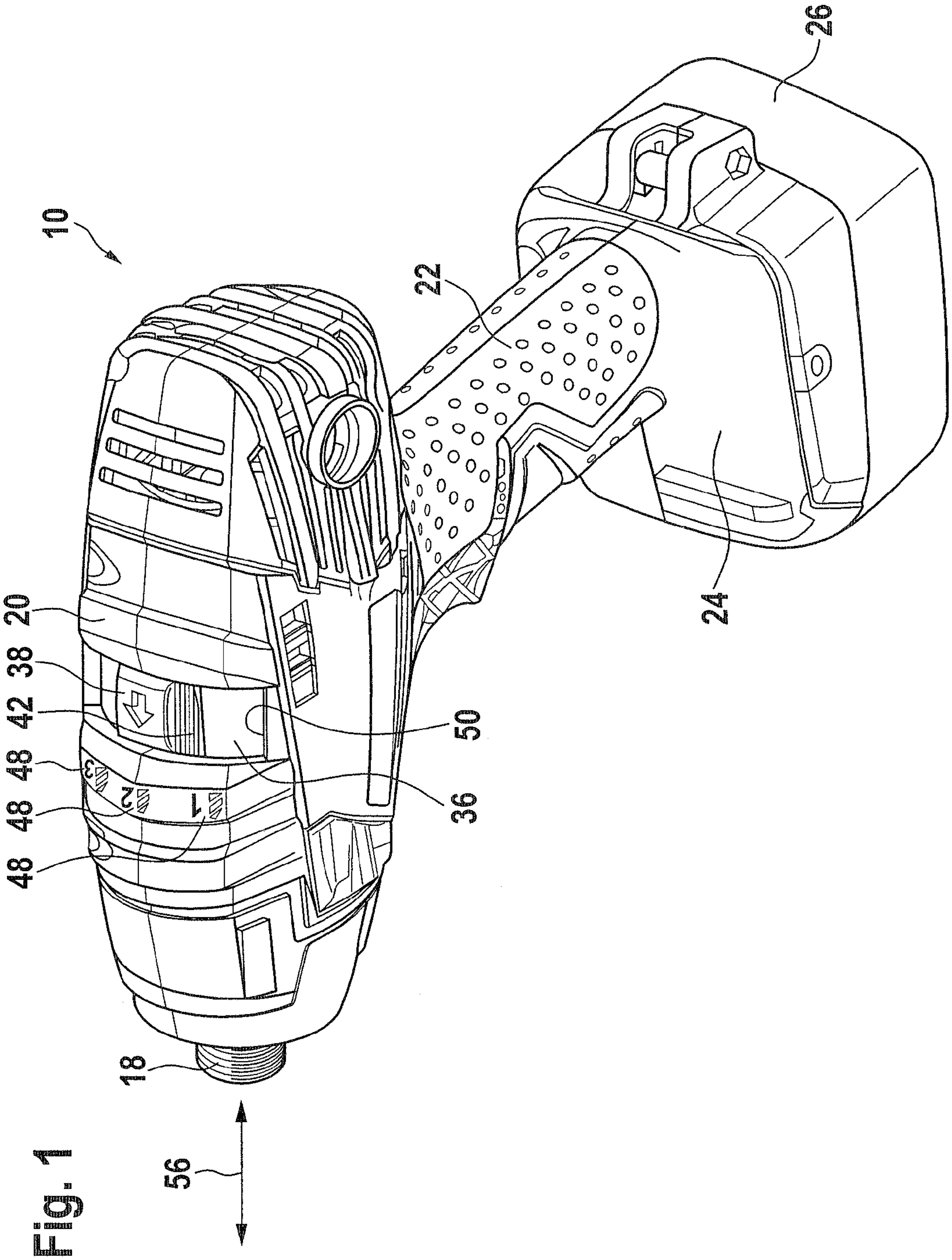
FIG. 1 is a top left perspective view of a cordless impact driver.

A perspective view of a hand-held rotary tool 10, in particular a cordless impact driver, is illustrated in FIG. 1. The speed and torque of the rotary output of a motor (not shown) is modulated by a gear assembly 12 and transmitted to an impact assembly 14. Construction details of impact assembly 14 are not shown since it comprises components well understood by those familiar with impact drivers, such as a striker, spring, and anvil for providing high torque impacts within a preferably metal impact assembly housing 16. An output shaft having a tool holder 18 extends from impact assembly housing 16. The motor, gear assembly 12, and at least a portion of impact assembly 14 are mounted within a preferably plastic tool housing 20 which extends to form a handle 22 and a base 24 for inserting a removable DC battery pack 26 to power the motor. Battery pack 26 is preferably rechargeable and based on lithium ion chemistry. The tool may alternatively include an intrinsic (i.e., non-removable) rechargeable DC battery pack. While a cordless tool is described, power to drive the motor may alternatively be provided by an electrical cord for drawing AC power.

Figure 4:
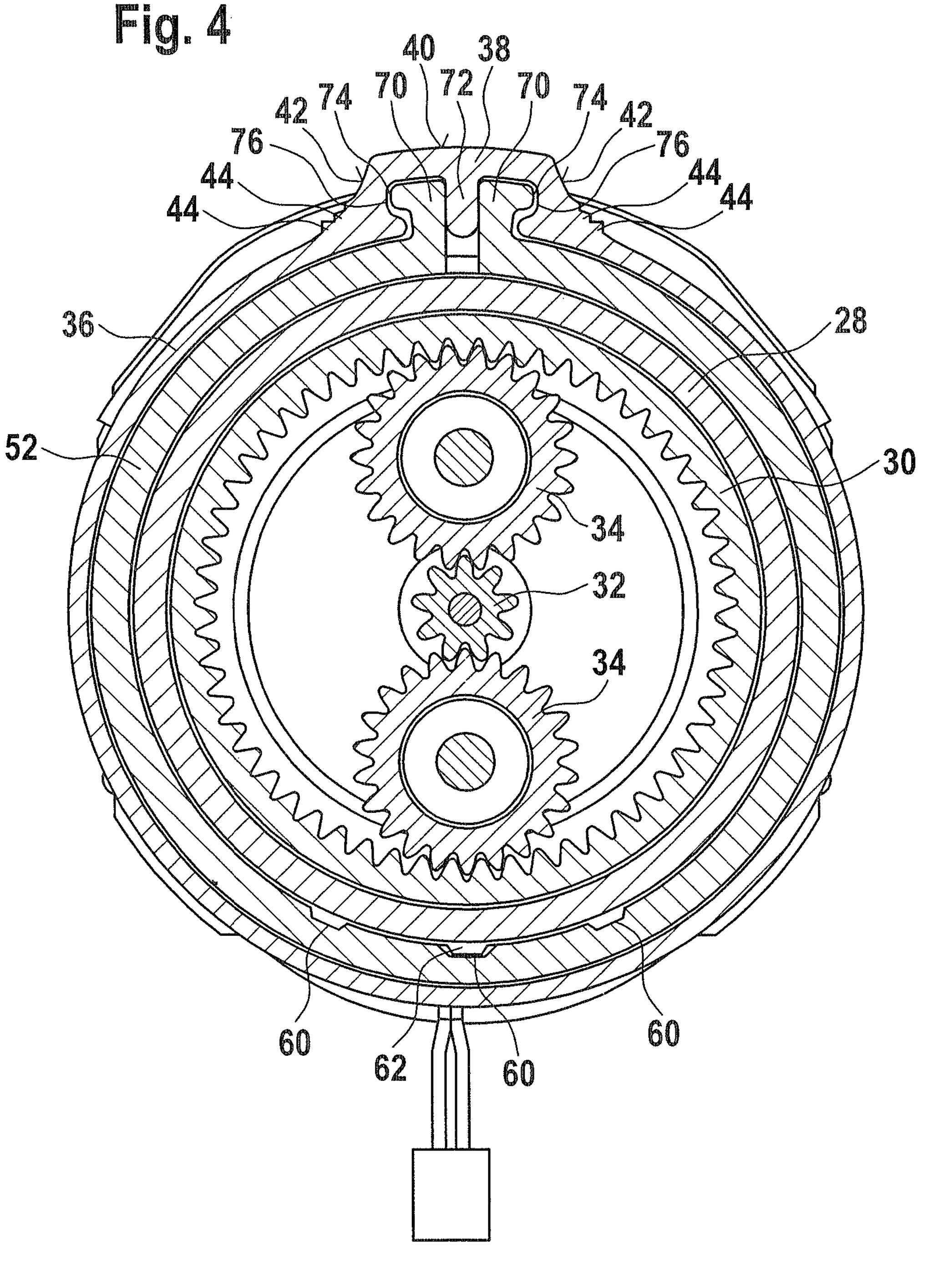
FIG. 4 is a section view of the gear assembly, impact assembly, and switch assembly at the position indicated by arc A-A in FIG. 2.

Exemplary components of gear assembly 12 are seen clearly in the cross sectional view of FIG. 4. Within a gear housing 28 are several stages of epicyclic gears, of which ring gear 30, sun gear 32, and planetary gears 34 are illustrated. Those skilled in the art will appreciate how enabling or disabling one or more of the stages of gear reduction can readily modify the output speed and torque output by gear assembly 12.

Figure 3:
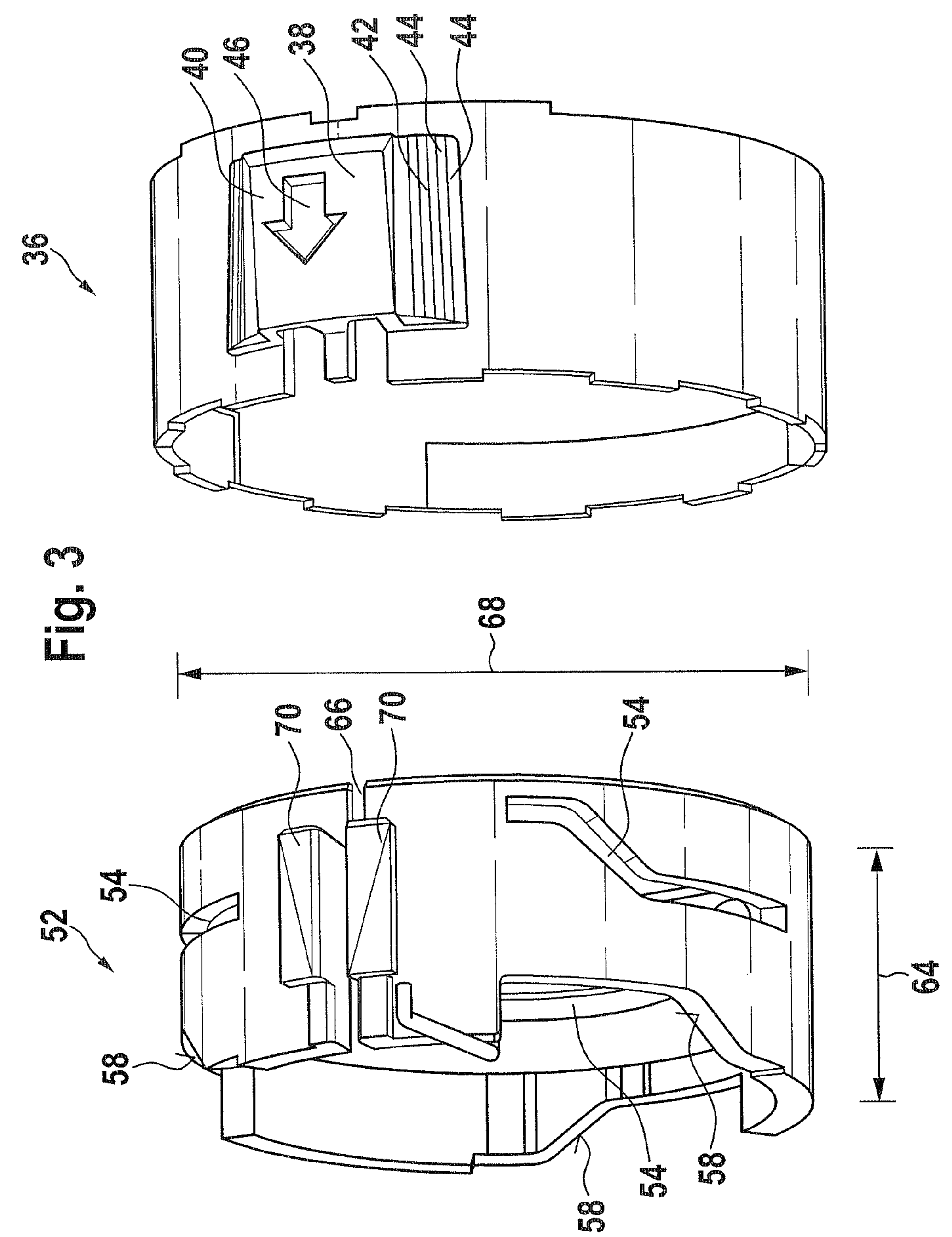
FIG. 3 is an exploded top left perspective view of the switch assembly.

The user controls the speed output of gear assembly 12 by rotating a switch assembly that is mounted around the gear housing 28. The switch assembly may comprise one unitary part, or it may be separated into more that one part as is illustrated in FIG. 3. In the preferred embodiment, the external part of the switch assembly is a mode switcher 36 which is provided with a switch button 38 having a substantially flat but arc-shaped top surface 40 as well as two sloped side surfaces 42 which are provided with multiple ridges 44 to facilitate manual rotation of mode switcher 36. Indication means such as arrow 46 are provided on top surface 40 for cooperating with corresponding indication means such as mode indicators 48 on tool housing 20. Switch button 38 is accessible through a generally rectangular slot 50 in tool housing 20 but is otherwise obscured by tool housing 20 (see FIG. 1). As such, the switch assembly is substantially within tool housing 20, in so far as the majority portion, but not necessarily all portions of the switch assembly fall within a fictive perimeter delineated by the outer surfaces of tool housing 20.

Mode switcher 36 interlocks with and serves as a substantially rigid outer sleeve for permitting the user to rotate a flexible switching ring 52 which comprises a second inner portion of the switch assembly (See FIG. 3). Switching ring 52 is provided with structural features that underlie changes in operational modes. For example, slots 54 are provided for translating rotation of switching ring 52 into axial movement of other parts, such as epicyclic gear components (not shown) along tool axis 56 in order to modulate rotary speed and torque. Sloped perimeter surfaces 58 are also shaped for translating rotation into axial movement of distinct parts (not shown) which mediate an impact on-off mechanism for switching the impact driver into a pure drilling (non-impact) mode. Therefore via switching ring 52, mode switcher 36 is involved in modifying multiple types of user modes. For reasons of balance, slots 54 and sloped perimeter surfaces 58 are arranged symmetrically around switching ring 52.

While a switch assembly having a distinct mode switcher 36 and switching ring 52 has been described, these two components may be integrated into a single part of unitary construction, wherein the solitary switch would retain each of the described features. However certain functionalities of the switch assembly that are described in the text that follows are preferably implemented by having mode switcher 36 and switching ring 52 as separate parts.

In the illustrated example, control is provided for three operational modes, although the invention is suitable for tools having additional modes. For each mode, there is a corresponding groove 60 provided on the inner face of switching ring 52. As switching ring 52 is rotated, the respective grooves 60 cooperate with a detent 62 provided on the outer surface of gear housing 28 (see FIG. 4). Neither the grooves 60 nor the detent 62 need to extend across the full axial width 64 of switching ring 52. Because of a fixed coupling with impact assembly 14 as well as other tool portions, gear housing 28 is fixed in position with respect to the tool 10. The detent-groove coupling is sufficient to retain switching ring 52 in a defined position relative to gear housing 28 even under conditions of heavy vibration when tool 10 is operating.

To switch between different modes the user manually rotates mode switcher 36. Switching ring 52 is not a true ring. It is ring-shaped and preferably formed of a flexible material such as plastic so that it may flex to increase the size of gap 66 thereby increasing its effective diameter. In doing so, it changes shape, but since it is flexible, it is resilient and if permitted to do so, will return to its original shape. A representative effective diameter 68 is shown in FIG. 3. Neck portions 70 near gap 66 interlock with the inner portion of switch button 38, but do not form a tight fit. When mode switcher 36 is rotated by the user, rib 72 presses against one of the neck portions 70, but because of gaps 74 provided between the neck portions 70 and inner wall 76, gap 66 will tend to increase whenever mode switcher is rotated. The increased diameter 68 will allow grooves 60 to separate from detent 62 so that switching ring 52 may rotate to bring detent 62 into alignment with an adjacent groove 60. Releasing mode switcher 36 when detent 62 is positioned within one of the grooves 60 allows switching ring 52 to return to its original position with reduced diameter 68. Mode switcher 36 has a substantially fixed shape, but if it is thinly constructed, it may also deform slightly when switching ring 52 enlarges its diameter 68.

Opposite from switch button 38, mode switcher 36 is provided with an extension 78 that creates a significantly larger width 80 of mode switcher 36 and thereby establishes shoulders 82. This extension 78 extends axially to overlap an end cap 84 of gear housing 28 which has radially-extending protrusions 86 for positioning the gear assembly 12 within the tool housing 20. End cap 84 may be constructed separately from the remainder of gear housing 28 or it may formed or molded as one continuous housing. Like the rest of gear housing 28, it contributes to enclosing and protecting the epicyclic gears from other tool components.

Figure 2:
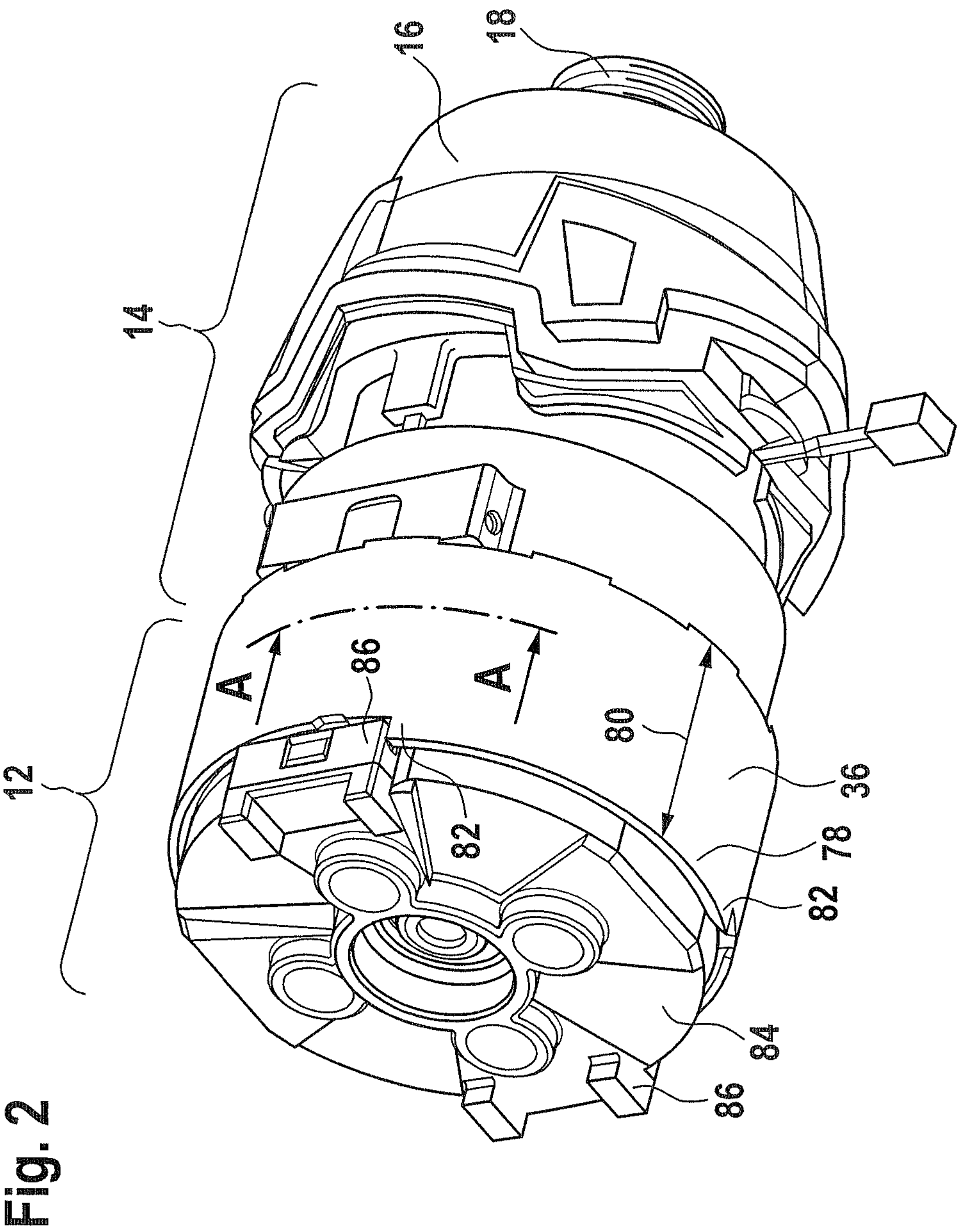
FIG. 2 is a bottom right perspective view of the gear, impact and switch assemblies.

Since the extension 78 of mode switcher 36 lies between these two protrusions 86 (see FIG. 2), the overall range of motion of mode switcher 36 is restricted when it is rotated. That is, each protrusion 86 acts as a blocking element and partially limits the overall range of motion, but together the two protrusions 86 define and delimit the overall range of motion. Depending on the direction of rotation, each of its shoulders 82 will ultimately come into contact with one or the other corresponding protrusion 86 as illustrated in FIG. 2. The position of extension 78 is selected so that it corresponds with the positions wherein detent 62 is in alignment with one of the outermost grooves 60. Alignment of detent 62 with one of the grooves 60 may somewhat restrict motion of the switch assembly, but detent 62 does not itself act as a limit stop, i.e., it does not limit the overall range of motion of the switch assembly.

The alignment of detent 62 with respective grooves 60 for positioning the switch assembly need not be coupled with means for limiting the range of motion of the switch assembly. For example, in alternate embodiments, the switch assembly may be free to rotate 360 degrees and therefore not require any sort of limit stops.

The foregoing relates to preferred exemplary embodiments of the invention, it being understood that other variants and embodiments thereof are possible within the spirit and scope of the invention, the latter being defined by the appended claims.

The invention claimed is:

1. A rotary power tool having an axis of rotation comprising:

a tool housing;

an internal housing within the tool housing; and a switch assembly that is substantially within the tool housing, supported by the internal housing, and movable between at least two positions for selecting between at least two tool operational modes, wherein the internal housing has at least one radially-extending blocking element that extends towards the tool housing and limits an overall range of motion of the switch assembly, and wherein the switch assembly has an extension extending from the switch assembly in a direction of the axis of rotation that is blocked by the at least one blocking element.

2. A power tool according to claim 1, wherein the power tool further comprises a plurality of gears within the internal housing.

3. A power tool according to claim 2, further comprising a motor, an output shaft, and a gear assembly that is involved in coupling the motor to the output shaft, wherein the internal housing is a part of the gear assembly.

4. A power tool according to claim 3, wherein the switch assembly is rotatable with respect to the axis of rotation.

5. A power tool according to claim 4, wherein the switch assembly is substantially ring-shaped.

6. A power tool according to claim 5, wherein the internal housing has a second radially-extending blocking element that extends towards the tool housing and limits the overall range of motion of the switch assembly, the first blocking element and the second blocking element together delimiting the overall range of motion of the switch assembly.

7. A power tool according to claim 6, wherein the switch assembly comprises a switch outer portion and a flexible switch inner portion which changes shape as the switch assembly is moved between the at least two positions.

8. A power tool according to claim 7, wherein the flexible switch inner portion is substantially ring-shaped and has a ring diameter which increases as the switch assembly is moved between the at least two positions.

9. A power tool according to claim 1, further comprising a motor, an output shaft, and a gear assembly that is involved in coupling the motor to the output shaft, wherein the internal housing is a part of the gear assembly.

10. A power tool according to claim 1, wherein the switch assembly is rotatable with respect to the axis of rotation.

11. A power tool according to claim 1, wherein the switch assembly is substantially ring-shaped.

12. A power tool according to claim 1, wherein the internal housing has a second radially-extending blocking element that extends towards the tool housing and limits the overall range of motion of the switch assembly, the first blocking element and the second blocking element together delimiting the overall range of motion of the switch assembly.

13. A power tool according to claim 1, wherein the switch assembly comprises a switch outer portion and a flexible switch inner portion which changes shape as the switch assembly is moved between the at least two positions.

14. A power tool according to claim 13, wherein the flexible switch inner portion is substantially ring-shaped and has a ring diameter which increases as the switch assembly is moved between the at least two positions.

15. A power tool according to claim 1, wherein the internal housing further comprises a detent that cooperates with at least one recess on the switch assembly to retain the switch assembly in a defined position relative to the internal housing.

16. A power tool according to claim 15, wherein the switch assembly comprises a switch outer portion and a flexible switch inner portion and the at least one recess is within the flexible switch inner portion.

17. A power tool according to claim 1, wherein a detent on the internal housing cooperates with at least one recess on the switch assembly when the extension of the switch assembly is in contact with the at least one blocking element.

18. A power tool according to claim 17, wherein the switch assembly comprises a switch outer portion and a flexible switch inner portion and the at least one recess is within the flexible switch inner portion.

19. A power tool according to claim 1, wherein the switch assembly comprises a switch outer portion and a flexible switch inner portion, and the extension extends from the switch outer portion in a direction of the axis of rotation.

20. A power tool according to claim 19, wherein the flexible switch inner portion has an inner face with at least one recess and the internal housing has a detent on an outer surface that cooperates with the at least one recess to retain the switch assembly in a defined position relative to the internal housing.

21. A rotary power tool having an axis of rotation comprising:

a tool housing;

an internal housing within the tool housing; and a switch assembly that is substantially within the tool housing, supported by the internal housing, and movable between at least two positions for selecting between at least two tool operational modes, wherein the internal housing has first and second blocking elements that extend towards the tool housing and limit an overall range of motion of the switch assembly, the first blocking element and the second blocking element together delimiting the overall range of motion of the switch assembly, and wherein the switch assembly has an extension extending from the switch assembly in a direction of the axis of rotation that is blocked by the first and second blocking elements.

22. A rotary power tool comprising:

a tool housing;

an internal housing within the tool housing; and a switch assembly that is substantially within the tool housing, supported by the internal housing, and movable between at least two positions for selecting between at least two tool operational modes, wherein the internal housing has at least one blocking element that extends towards the tool housing and limits an overall range of motion of the switch assembly, wherein the switch assembly has a switch outer portion and a flexible switch inner portion which changes shape when the switch assembly is moved between the at least two positions, and wherein the flexible switch inner portion is substantially ring-shaped and has a ring diameter which increases as the switch assembly is moved between the at least two positions to provide additional clearance for adjusting the switch assembly so that the switch assembly overcomes retaining structure on the internal housing.

23. A power tool according to claim 22, wherein the switch outer portion interlocks with and serves as a substantially rigid outer sleeve for permit-ting a user to rotate the switch inner portion.

24. A power tool according to claim 22, wherein the switch inner portion comprises a gap such that by increasing the size of the gap the effective diameter of the switch inner portion is increased.

25. A power tool according to claim 24, wherein the switch inner portion comprises neck portions near the gap which interlock with the switch outer portion.

26. A power tool according to claim 25, wherein the switch outer portion comprises a switch button including a rib which engages with the neck portions.

27. A power tool according to claim 26, wherein the rib, upon rotation of the switch outer portion by a user, presses against one of the neck portions such that the gap is increased.

* * * * *